United States Patent [19]

Deese

[11] 3,818,458

[45] June 18, 1974

[54] METHOD AND APPARATUS FOR MONITORING A GENERAL PURPOSE DIGITAL COMPUTER

[75] Inventor: Donald R. Deese, Camp Springs, Md.

[73] Assignee: Comress, Rockville, Md.

[22] Filed: Nov. 8, 1972

[21] Appl. No.: 304,649

[52] U.S. Cl. .......... 340/172.5
[51] Int. Cl. .......... G01r 15/12
[58] Field of Search .......... 340/172.5

[56] References Cited

UNITED STATES PATENTS

| | | | |
|---|---|---|---|
| 3,344,408 | 9/1967 | Singer et al. | 340/172.5 |
| 3,368,203 | 2/1968 | Loizides | 340/172.5 |
| 3,522,597 | 8/1970 | Murphy | 340/324 |
| 3,536,902 | 10/1970 | Cochran et al. | 235/153 |
| 3,540,003 | 11/1970 | Murphy | 340/172.5 |
| 3,599,091 | 8/1971 | Warner | 324/73 |
| 3,688,263 | 8/1972 | Balogh et al. | 340/172.5 |

*Primary Examiner*—Paul J. Henon
*Assistant Examiner*—Michael Sachs
*Attorney, Agent, or Firm*—Stepno, Schwaab & Linn

[57] ABSTRACT

A method and apparatus for monitoring the utilization and performance of a general purpose digital computer without affecting operation of the computer itself, in which the monitor responds to a change in the operative state of the computer to capture the contents of certain status registers and locations in memory associated with the type of state change which has been detected and identifies the time at which such state change has occurred for analysis and time correlation by a data processor.

6 Claims, 6 Drawing Figures

METHOD AND APPARATUS FOR MONITORING A GENERAL PURPOSE DIGITAL COMPUTER

BACKGROUND OF THE INVENTION

1. Field of the Invention:

The present invention relates to the monitoring of digital computers and, more particularly, to a method and apparatus for extracting large quantities of utilization and performance data from a general purpose digital computer.

2. Description of the Prior Art:

With the advent of third generation computers, the elements of the total system complex, namely, hardware, operating system software, application programs and the like, have become so critically interdependent that traditional methods of evaluating system performance are now ineffective. Early attempts to study the interactions of these performance variables tended to be modifications to systems software which sampled the status of system components and instructions executed. These attempts, while innovative in their time, generally provide neither the accuracy nor the flexibility needed to monitor today's computing equipment.

Determining the use of the various components of a general purpose digital computer is of interest for a number of reasons and is particularly important in connection with modern systems which, by reason of their great size and expense, must be shared by a number of customers having distinctly different problems for computer solution. For example, it is often necessary to account for the actual use time of the various computer components by each customer having programs executed by the system for billing and related purposes. Furthermore, to reduce costs, it is desirable to improve overall system efficiency by examining the use of the system components so as to enable the balancing of parameters inherent in the data processing system as well as those involved in the scheduling of the shared use of system components by the various computer users. An analysis of the use of the computer components is also of interest in providing parameters for the establishment of mathematical models of the data processing system which may be used in conjunction with a mathematical simulator to predict system performance under various work loads and conditions of operation.

A number of attempts have been made in the past to accomplish the above objectives, but have proven to be only partially satisfactory for a number of distinct reasons. Computer monitors heretofore available have generally measured system activity by counting or timing individual signals received from various points in the computer. In the count mode, each transition of a monitored signal between its false and true states causes a counter to increment and thereby provide the monitor operator with an indication of the number of status transitions of the monitored signal during any observed period of computer operation. In the time mode, the signal to be timed is combined with an internally generated clock signal through an appropriate logic gate such that the clock signal is fed to a suitable electronic counter only when the signal to be monitored is in a true condition.

Thus, in both cases, the effectiveness of the monitoring process is directly related to the number of counters being used which, in the past, has been normally limited to 16 or 32 since the cost of adding additional counters is significant; e.g., $14,000 to $40,000 for an additional 16 counters. Furthermore, and perhaps even more meaningful, is the fact that there are literally hundreds of areas within the computer which are of interest and require virtually simultaneous monitoring. Thus, the relatively small number of measuring devices or counters available in prior art systems severely hampers the measurement process and the amount, accuracy and effectiveness of collected systems analysis data.

While the above problems and drawbacks of prior monitoring systems have long been well known, a simple yet flexible approach to effective, economical and efficient monitoring of computer operation has heretofore been unavailable and has proven to be a material disadvantage in the efficient planning of expensive digital computer time and the analysis of computer utilization.

SUMMARY OF THE INVENTION

It is, therefore, an object of the present invention to monitor a substantially greater number of computer components at considerably lower cost than capable by systems heretofore available.

This invention has another object in the construction of monitoring apparatus external to the computer under evaluation and operatively independent thereof such that program execution by the host system is unaffected by the monitoring process.

A further object of this invention is to extract accurate information relating to the utilization of various elements in a data processing system by a number of different programs being executed on the system for precise customer-time allocation.

A still further object of this invention is to extract computer utilization information from a data processing system in a form suitable for data analysis by a programmable small-scale digital computer.

The present invention has another object in the monitoring of the utilization of a general purpose digital computer by accurately identifying the time of occurrence of an interrupt or state change, the cause of the state change and appropriate information relating to the status of various elements within the data processing system and thereafter correlating such information into a useable form.

It is another object of the present invention to monitor the use of a computer component by registering the address of such component at the instant it becomes active, by registering the address of such component at the instant it becomes inactive, and thereafter correlating the above information and comparing the start and stop times to accurately record component use.

The present invention has a further object in the measurement of channel, device and identifier addresses at the instant of occurrence of state changes within a general purpose digital computer and identifying such data with the precise time of such state change.

The present invention is summarized as a performance monitor for a general purpose digital computer having a processing unit, a main storage bank for storing programs and data, an input-output network connecting the computer with a plurality of external devices via selected communication channels, and a control unit capable of interrupting the processing unit, the computer having a plurality of distinct operative states, the monitor including a first register connected with the computer for registering the occurrence of a state change exhibited thereby, a second register connected with the computer for registering the address of the computer component associated with the state change, a third circuit responsive to the occurrence of the state change for registering the time of occurrence thereof, and a data processor connected with the first, second and third networks and responsive to the data collected thereby for generating an output indicative of the utilization and performance of the computer.

The present invention is advantageous over prior art monitoring systems in that substantially greater amounts of utilization and performance data may be extracted without disrupting or interrupting host computer operation, than extracted information is in a form suitable for subsequent data processing, that information may be gathered with greater accuracy and completeness and with material cost reductions, that customer time allocation data may be more precisely recorded for accurate billing calculations, that program evaluation may be readily accomplished so as to enable program revision for achieving computer time reductions and efficiency savings, and that greater flexibility is provided for the monitor operator.

Other objects and advantages of the present invention will become apparent from the following description of a preferred embodiment when taken in conjunction with the accompanying drawings.

DESCRIPTION OF THE PREFERRED EMBODIMENT

Figure 1:
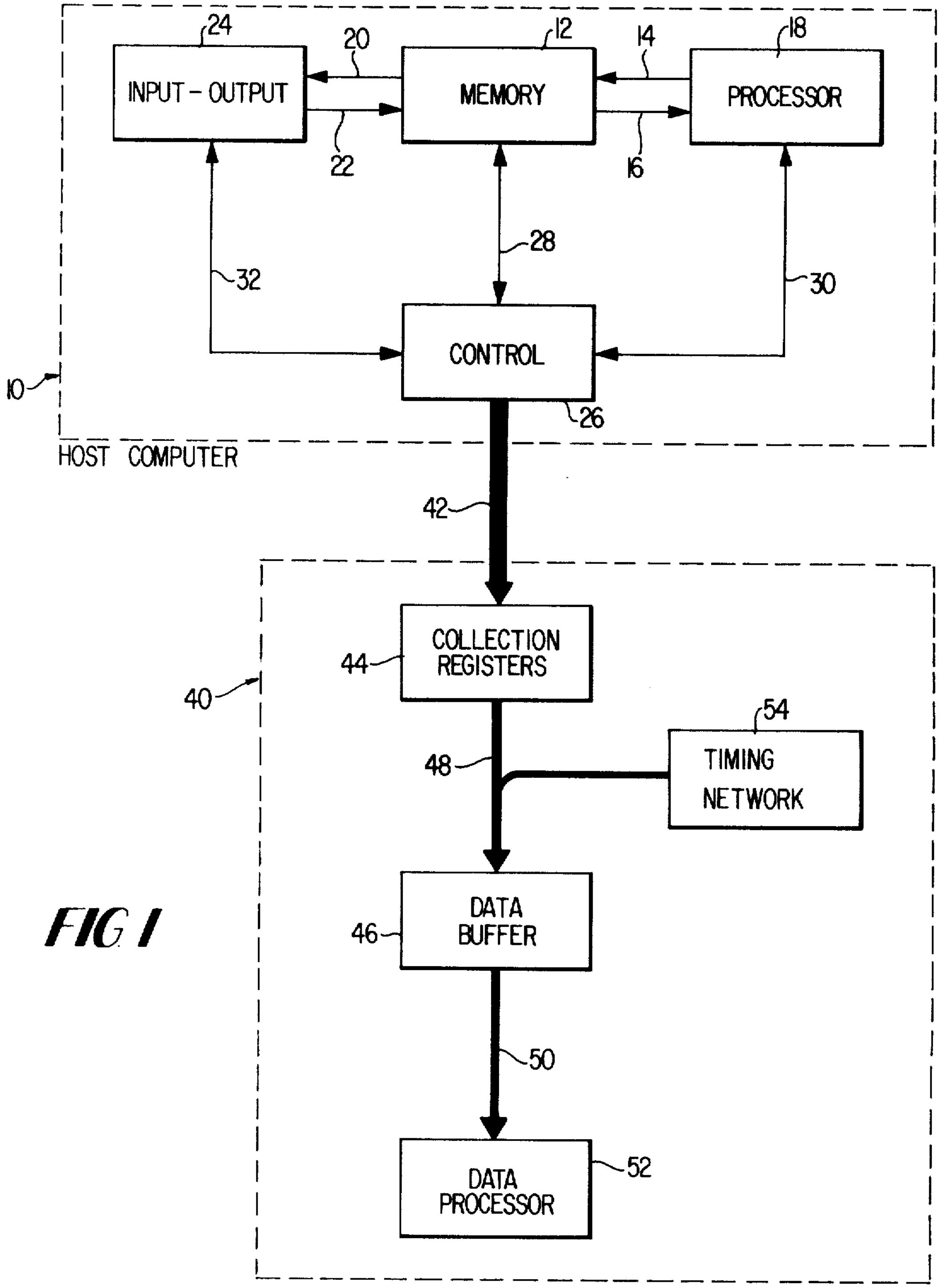
FIG. 1 is a block diagram of a general purpose digital computer to which is connected a preferred embodiment of a computer monitoring system in accordance with the present invention.

The present invention is adapted to be utilized in connection with the monitoring of a general purpose digital computer illustrated diagrammatically at 10 in the block diagram of FIG. 1. Computer 10 includes a main memory bank 12 for storing both data to be processed and the host computer program of operations composed of processing instructions. The memory bank 12 is connected via input and output lines 14 and 16, respectively, with a central processor 18. Likewise, both the processor and main memory bank are connected via lines 20 and 22 to a suitable input-output network represented by block 24.

As is well known, the computer 10 is adapted to service a number of different peripheral pieces of equipment, such as machine tools, a system complex of thousands of valves, sensors, pumps and pipelines, an electronically driven line printer, communications lines, teletype units and the like. For purposes of simplicity, it should be understood that all such peripheral apparatus, even though spaced at distance points from the computer, are integrally tied thereto by various communications channels and are represented for purposes of this disclosure by input-output network 24. A control network 26 in the host computer 10 is connected to the memory bank 12, the central processor 18, and the input-output equipment 24 by lines 28, 30 and 32, respectively, and contains a number of indicators and registers which, at appropriate times, reflect the operative status of the various elements within the computer system or identify where the status of elements can be obtained.

The illustrated embodiment of the present invention is implemented for use in connection with the structure of IBM system 360 and system 370 computers for exemplary purposes only, and it will be readily appreciated that the method and apparatus according to the present invention is generally applicable to all general purpose digital computers. Since the host computer, per se, forms no part of the present invention and, in the case of IBM system 360 and system 370 computers, is well documented in computer literature, no attempt will be made herein to describe the hardware or software structure of computer 10 in any further detail for the sake of clarity and brevity. For the sake of completeness, however, in connection with the illustrated embodiment reference is hereby made to IBM maintenance manual number Y22-2833, for the IBM system 360/50, which manual is by reference incorporated herein.

The present invention is embodied in a monitoring network indicated generally at 40 in FIG. 1 in the form of a separate system external to the host computer system 10. The present monitor 40 is linked to the computer by a plurality of signal extraction lines represented by cable 42 running from the control network 26 to a plurality of collection registers 44 of the monitor. The high speed collection registers 44 store certain gathered data from the host computer 10 and, upon the detection of a computer state change, supply such stored data to a high speed data buffer 46 by means of lines 48. Data buffer 46 is provided with appropriate priority switching or sampling circuitry and transfers the data received from collection registers 44 over lines 50 to a data processing unit 52 of the monitor 40. The data buffer 46 also receives timing information from a high resolution timing network 54 which is integrally tied with the receipt of data from the host computer for identifying accurately the time of occurrence of the detected state changes.

Before proceeding with a detailed description of the circuitry of the monitor 40, it may be well to describe the overall sequence of operation established in accordance with the method and apparatus of the present invention. In contradistinction to the basic theory of operation of prior art monitoring systems, which necessitated that a separate counter and monitoring network be associated with each component to be analyzed at all times, the present invention collects data indicative of the location and status of various components associated with a particular state change only at the instant of occurrence thereof thereby decreasing the total monitoring equipment count to a small fraction of that heretofore required.

In monitoring the utilization of the components of a data processing system, it is necessary to identify the binary state of the various components of the system during operation. The binary state of each component, e.g., stopped/running, wait/active, busy/not busy, etc., when correlated with the resident time of each component in its active state, accurately reflects the overall utilization and performance of the computer in operation. Obviously, each specific component or subcomponent, which includes both individual computer channels and the various units or devices associated with each channel, reverts between its "in use" and "not in use" condition by the process of changing state. Thus, and in accordance with the present invention, by accurately identifying the time of occurrence of a detected state change and correlating the same with the channel device and user program associated with such state change, and accurate picture can be readily formulated of the overall host computer activity. This picture is simply constructed by means of two extremely rapid measurements one at the beginning or the entry of a component into its "in use" state and a second upon the terminal of activity when the component reverts to its "not in use" state. When it is recognized that the occurrence of these state changes consumes only a fraction of the active time of each component, it can be readily appreciated that the monitoring method according to the present invention results in substantial savings of both time and complex monitoring equipment, and in a very real sense represents a material advance in the art.

Referring again to FIG. 1, a state change in control unit 26 of the host computer 10 is utilized to signal via cable 42 the collection of information about the operating conditions of those active elements or components of the host computer system associated with such state change. The information collected from the host computer upon the detection of a state change may, for example, identify the channel and device address of the component initiating the state change as well as an indication of the user program key associated therewith. Such information is stored into the high speed collection registers 44 of monitor 40 and is immediately transferred on a priority basis into the high speed buffer 46 along with the precise time of its occurrence as registered by timing network 54.

The contents of the high speed buffer 46 may thereafter be read by the data processing network 52, which preferably takes the form of a small-scale programmed digital computer. At this point, it is noted that while the use of a digital computer for purposes of collating and analyzing the data collected and transmitted by the data buffer 46 of monitor 40 is preferred for obvious reasons of data capacity and processing flexibility, the present invention is adaptable for use with any number of hard wired or soft wired data processing techniques. For example, the data received from the buffer 46 may be applied directly to appropriate magnetic tape storage banks for subsequent processing by the host computer itself or may be processed by special purpose computation networks tied directly to the buffer or coupled thereto by appropriate data communication channels.

In the preferred embodiment illustrated herein and described below, three collection registers are used to collect various state change information about computer operation along with a timing register having a resolution in the range of 100 nanoseconds to 1 millisecond. At each state change which is detected, stored data in the timing register and one or two of the three collection registers is transmitted on a priority basis through the data buffer 46 to the associated data processing computer 52. The information thus recorded is thereafter analyzed for purposes of providing program status maps, customer use time allocation and any various user desired operational or performance analyses.

Figures 2, 5:
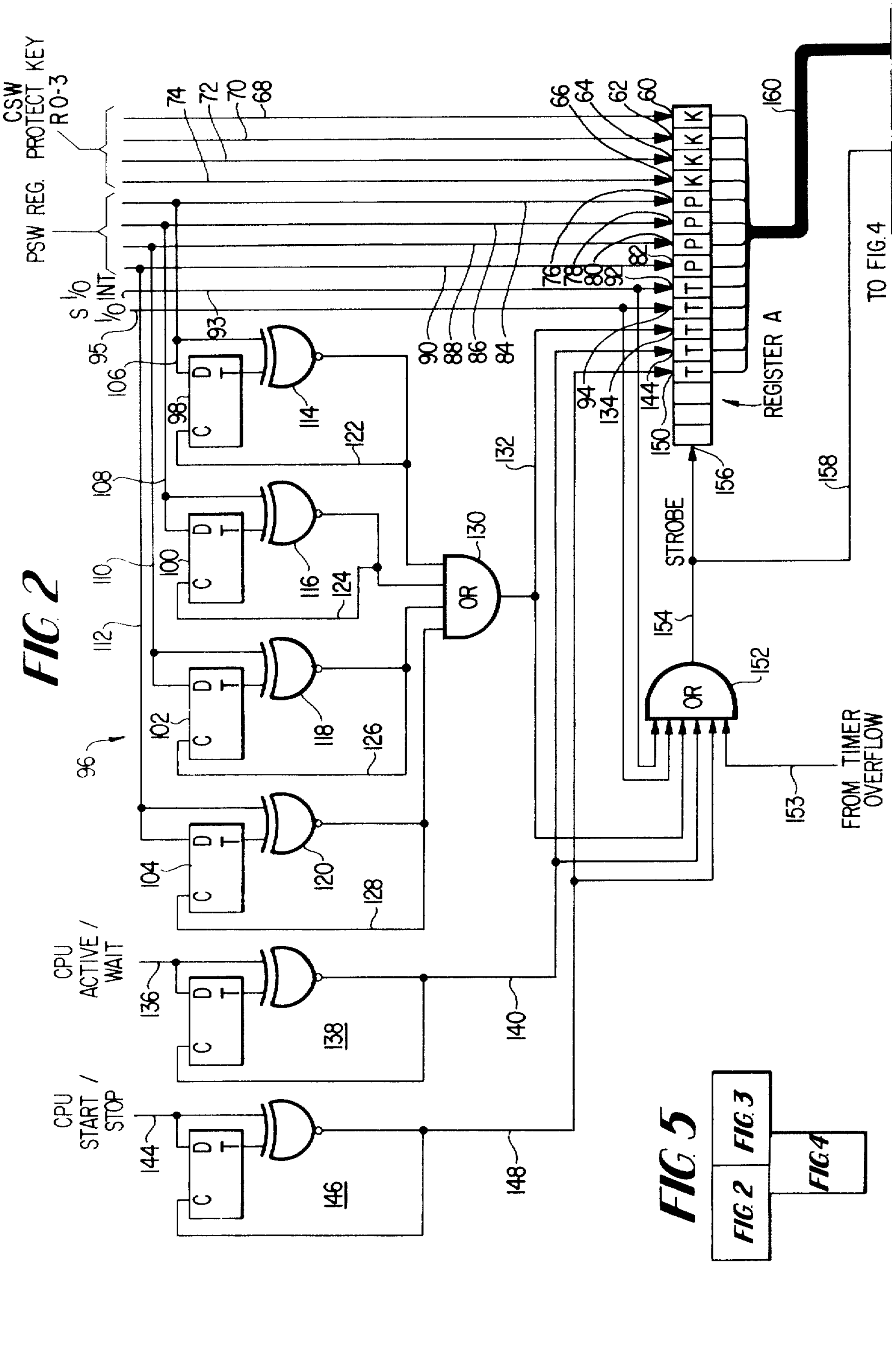
FIGS. 2, 3 and 4 are schematic diagrams which, when taken together as illustrated in FIG. 5, represent a preferred embodiment of the computer monitoring apparatus of FIG. 1.

Referring to FIG. 2, a first collection register A which, as illustrated, is capable of handling 16 bits of information, has a first set of four inputs 60, 62, 64 and 66 connected via lines 68, 70, 72 and 74, respectively, to the host computer so as to receive a 4-bit binary word representing the channel status word protect key from the host computer. For the sake of completeness, it is noted that with respect to the IBM system 360/50 computer, the channel status word protect key may be readily obtained by connecting lines 68 through 74 to the R-register, bits 0 through 3. Detailed information concerning the location and identification of the above may be readily obtained by reference to the appropriate IBM technical and maintenance manual referred to above. Likewise, the appropriate connections to other general purpose digital computers may be readily identified by reference to available literature associated therewith. Lines 68 through 74 may be connected in any suitable fashion to the host computer as, for example, by means of a differential switch type sensor (not shown) having live and ground probe tips and capable of sensing logic signals with a width of 30 nanoseconds or less. While information may be extracted by direct connection with the computer or through various probe or connector networks, the use of a differential switch type, high impedance, non-interferring sensor is preferred in that it results in the provision of well defined input signals to the monitor and enables the use of relatively long interconnecting cables.

In like manner, the next four inputs 76, 78, 80 and 82 of register A are connected via lines 84, 86, 88 and 90, respectively, to receive the 4-bit binary program status word protect key from the program status word register of the host computer. A next input 92 of register A is connected by lead 93 to the interrupt signal line of the host computer, hereinafter referred to as the I/O interrupt state change signal. The start input-output or start I/O signal line of computer 10 is in similar manner connected to the next bit of register A at input 94 by lead 95.

The 4-bit binary word representing the program status word protect key on lines 84 through 90 is also connected to register A through four identical pulse transformation logic networks, indicated generally at 96. Each of the logic networks responds to the change of state of its respective input for providing an output pulse signal. The logic networks each include a D/C latch 98-100-102-104 having a clock input hub C, a data input hub D and a true output terminal T. As is well known, a true logic transition at the clock input hub of the latch will cause the transfer of the data level, be it true or false, existing at the data input hub D to the true output terminal T. As shown in FIG. 2, the data input hub of each latch network is connected to a respective one of the four bits of the program status word protect key via lines 106, 108, 110 and 112, respectively. Each bit of the program status word is likewise connected to one of the two inputs of a bit comparator 114-116-118-120 which receives at its other input the true output signal from its corresponding latch. The output signals of the bit comparators 114 through 120 are inverted and fed back via lines 112, 124, 126 and

128, respectively, to the clock input hub C of its associated latch network.

In operation, when each one of the logic networks detects a transition for example from a false to a true state, the first of the two inputs of its associated bit comparator will follow such transition while the second input thereof will remain at the previous level. Since the two inputs to the bit comparator will be unequal at this time, a positive going signal will be provided from the inverted output of the comparator. The positive going transition, when fed back to the clock input hub C of the latch network, causes the transfer of the true signal on data input hub D to the true output hub T thereby equalizing the two inputs of the bit comparator and causing its output to revert to a false level. Therefore, upon each transition of the input signal fed to each logic network, a single output pulse will be provided, with the four output signals from the logic assembly 96 fed to a four input OR gate 130. The pulse output signal from OR gate 130 thus indicates a program state change in the host system and is fed via line 132 to input 134 of register A.

Another probe is connected to the active/wait signal line of the host computer and is fed via lead 136 to a pulse generating logic network 138 which is identical to the logic networks previously described with respect to assembly 96 and, thus, will not be described again. The output signal from logic network 138 is coupled by line 140 to input terminal 142 of the next bit of register A, as illustrated. In like manner, the computer start/stop signal line is tapped by line 144 and fed to an additional logic network 146 which is, again, identical to those previously described. The output pulse from logic network 146 is coupled by lead 148 to input 150 of register A which is the last bit utilized in the illustrated embodiment.

As shown in FIG. 2, register A contains three additional unused bits which are available for interconnection with other state change signals within the host computer for which monitoring may be desired. As will be appreciated from the discussion which follows, numerous additional or different interconnections with the host computer may be made depending upon the desired data to be collected.

The five signals applied to input terminals 92, 94, 134, 144 and 150 of register A are also applied to the first five inputs of a six input OR gate 152 as shown. The sixth input of OR gate 152 is connected to receive a timer overflow signal from the monitor timing register, as will be more fully described below. The output of OR gate 152 is connected via line 154 to the strobe input 156 of register A and, in addition, is coupled by line 158 to one input of a register identification network which will also be described below. The thirteen output signals from register A are collected and fed via a 13 wire cable 160 to input port A of a priority sampling network (FIG. 4) associated with the data buffer 46 of monitor network 40.

Register A is responsive to and serves to identify the various state changes being monitored from the host computer as well as identifications of the program status word and channel status word protect keys for subsequent data analysis. Thus, register A will be referred to as the state change register as the present description continues.

Figure 3:
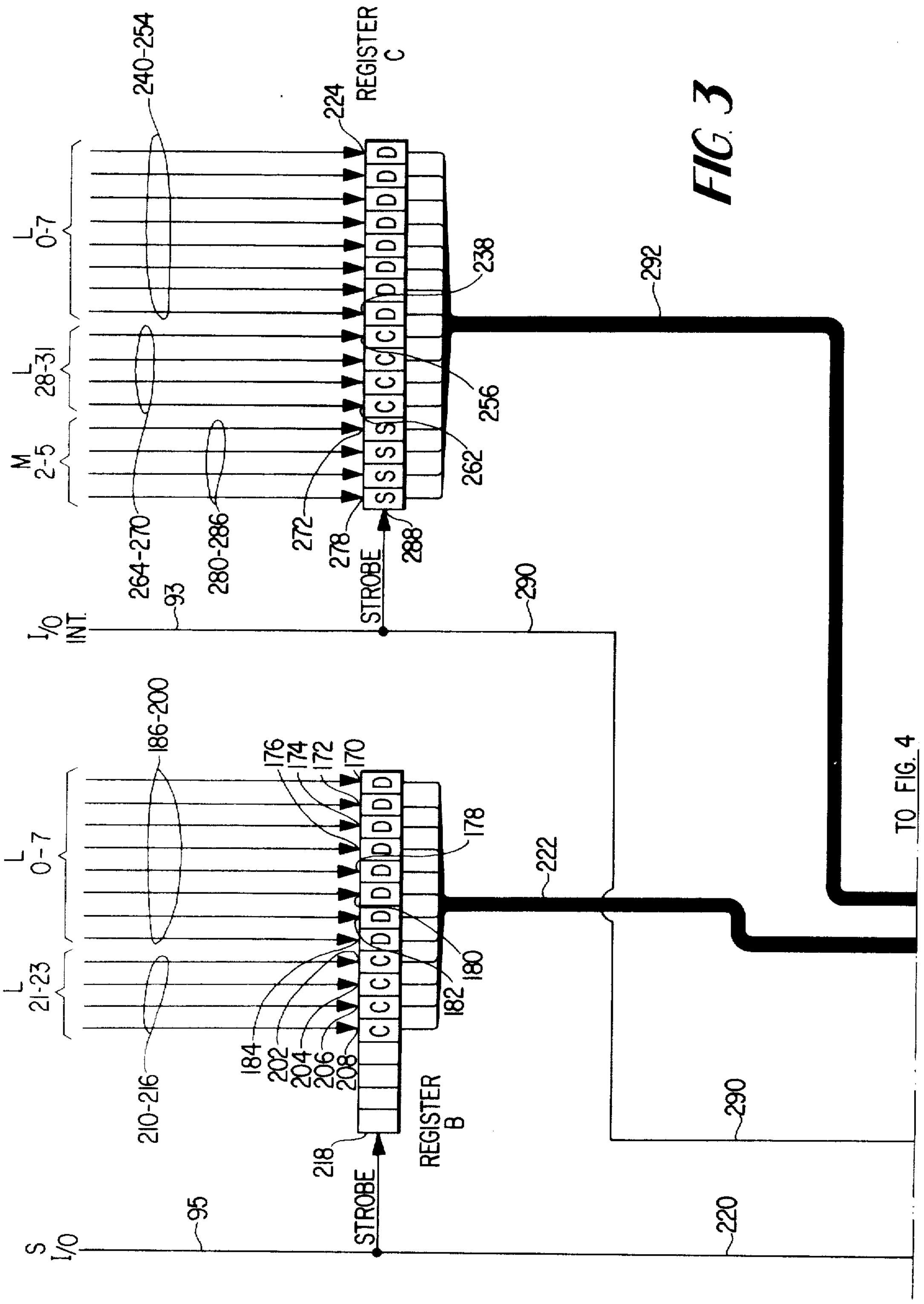

The two additional registers identified as registers B and C in FIG. 3, are responsive, respectively, to the gathering of data at the start of an input/output command and at an input/output interrupt. Register B, which will be referred to as the start I/O data register, like Register A may be a standard 16 bit collection device having a first set of 8 inputs 170 through 184 connected via lines 186 through 200, respectively, and suitable attachment probes to bits 0 through 7 of the host computer register L. In this manner the first 8 bits of register B will store the device address of the particular component in the host computer associated with a start I/O command. In similar manner, the next four bits of register B are connected via input terminals 202 through 208, lines 210 through 216, respectively, and the appropriate probe connections to the host computer for receiving the information in bits 21 through 23 of register L thereof. The 4 bit word from bits 21 through 23 of register L identifies the channel of the device associated with a start I/O command. The start input/output signal from computer 10 on line 95 (FIG. 2) is connected to the strobe input terminal 218 of register B and is also fed via line 220 to a second input of the register identification network described below. As in the case of register A, the 12 output signals from register B are collected and fed via a 12-wire cable 222 to input port B of the priority sampling network of FIG. 4 associated with data buffer 46.

Register C, which will be referred to as the I/O interrupt data register, is a 16 bit register identical to those previously described and having a first set of 8 inputs 224 through 238 connected via lines 240–254 to bits 0 through 7 of the L register of host computer 10 for storing the device address of the computer component associated with an input/output interrupt command signal within the host system. Similarly, the next 4 inputs 256 through 264 of register C are connected by leads 264 through 270 and appropriate probe connectors to bits 28 through 31 of register L so as to register the channel address again associated with an I/O interrupt.

The next 4 bits of register C are supplied by inputs 272 through 278, lines 280 through 286, and suitable probe connectors with a 4-bit binary word representing the status of the particular channel associated with the I/O interrupt from the host computer register M, bits 2 through 5. The I/O interrupt signal from the host computer on line 93 is fed to the register strobe input terminal 288 and likewise fed via line 290 to a third input of the register identification network of FIG. 4. The 16 output signals from register C are collected and fed via a 16-wire cable 292 to input port C of the priority sampling network of FIG. 4 in like manner as described with respect to registers A and B.

Figure 4:
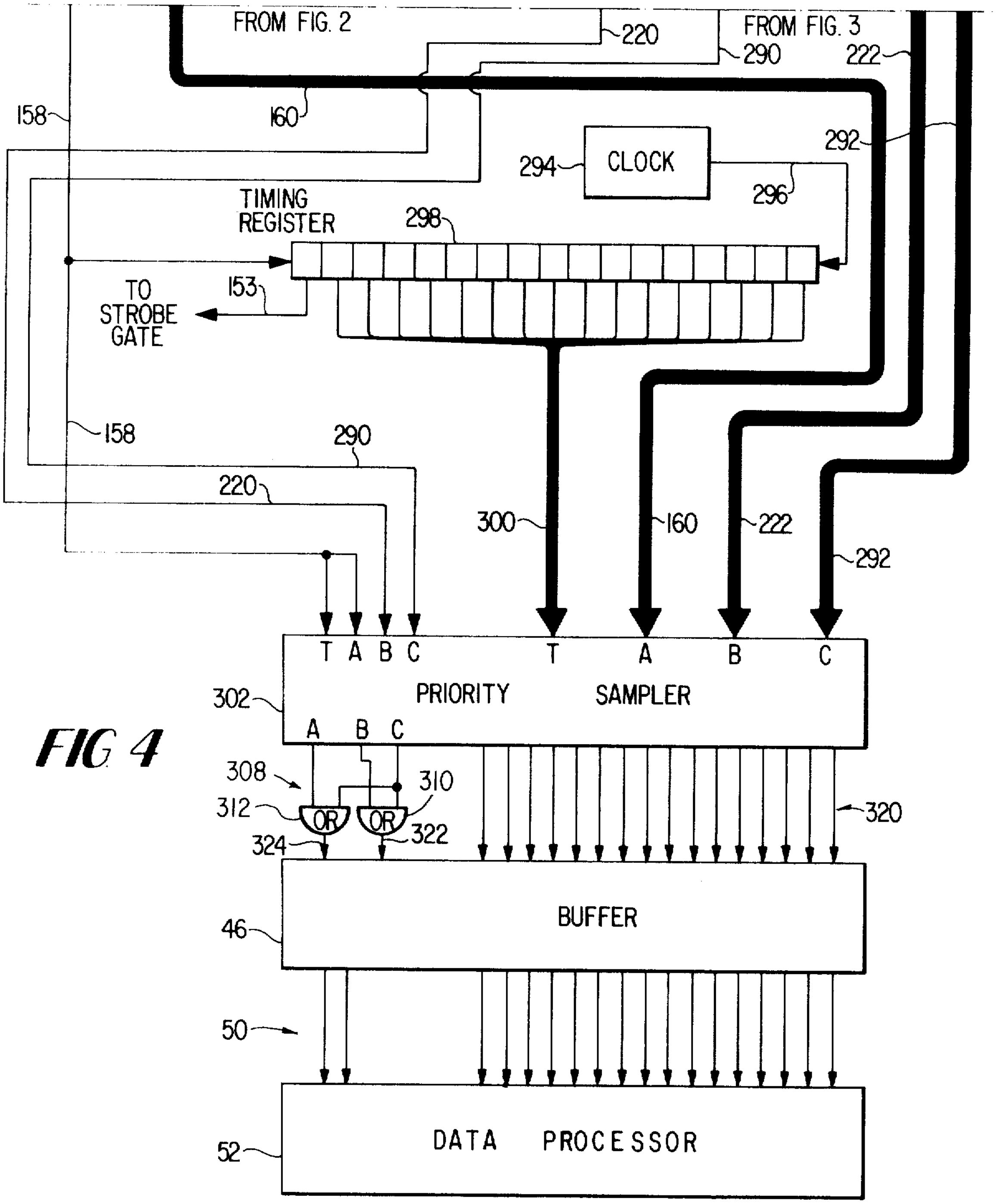

Referring now to FIG. 4, a high resolution electronic clock 294 in the form of a 10 MHz oscillator, such as that shown in U.S. Pat. No. 3,688,263, provides clock pulse output signals on line 296 to the input of a timing register 298. Register 298 is preferably a 17-bit counting register with the output signal of the 17th bit functioning as a timer overflow signal and fed via line 153 to the strobe gate 152 of register A (FIG. 2). The 16 output signals of register 298 are collected and fed by a 16-wire cable 300 to input port T of the priority sampling network 302.

The priority sampling network 302 additionally receives the signals on line 158 from register A, line 220 from register B, and line 290 from register C identifying the strobe read out sequence which are occurring. The signal on line 158 is also fed to the strobe input terminal 314 of the timing register 298 such that the register contents of both the timing register and register A will be strobed simultaneously. The priority sampler 302 responds to the identification signals on lines 158, 220 and 290 to transfer or dump the signals received at input ports A, B, C, and T via a 16-bit interconnecting line 320 to the data buffer 46. Sampler 302 also generates a 2-bit identification word which is fed to the buffer by lines 322 and 324. The identification word is provided by the output of a pair of OR gates 310 and 312. Gate 310 has a first input connected to receive a signal from an output terminal A of network 302 whenever the contents of register A are being fed to buffer 46 by the priority network. Similarly, a second input of gate 310 and one of the two inputs of gate 312 are connected with an output terminal C of sampler 302, and the other input of gate 312 is connected with an output terminal B of the sampler. If the 16-bit output on lines 320 is being transferred from timing register 298, the absence of any signal at output terminals A, B and C of sampler 302 causes the transmission of a "00" identification word by lines 322 and 324 to the buffer to apprise the same of the incoming timing word.

The priority sampler 302 is designed to feed the buffer in accordance with a suitable, preselected priority scheme such that only one 16-bit word from only one of the registers is fed to the data buffer 46 at a time. For example, the sampler may pass the contents of timing register 298 and then the contents of those data collection registers associated with the state change which occurred at that instant of time, and continually repeat the above sequence as long as data is received from the host system. The priority sampling network 302 may be of any suitable construction and may take any number of forms well known to those of ordinary skill in the art and thus will not be described in detail for the sake of brevity. One such network suitable for use in connection with the present invention is an octal priority encoder sold by Texas Instruments and described in their TTL Data Book Catalog No. CC-411-71241-23-CHI.

The output of buffer 46 is supplied via interconnecting cable 50, consisting of a 16-wire cable along with 2 wires carrying the 2-bit register identifier, to the data processor 52. As noted briefly above, the data processor 52 is preferably a small-scale programmable digital computer, the specific structure of which will not be described in detail. However, reference is made to the Model D8011 mini-computer sold by the Comress Corporation of Rockville, Maryland, and described in the D-8000 User's Manual, May 1972, which has been found to be particularly well adapted for use in conjunction with the present invention.

In describing the operation of the monitor according to the present invention, it will first be assumed that the host computer 10 is operating in its normal mode upon a number of different customer programs. During operation, register A will contain indicators describing the type of state change, the new state which is being entered, and other additional data describing the state of major systems components. Referring to FIG. 2, this may be readily appreciated by an examination of the characteristics of the information contained within each bit of register A. As explained above, the first 4 bits, starting from the right, contain the channel status work protect key identified by the letter K. The next 4 bits, namely, bits 4 through 7, will contain the program status work protect key, identified by the capital letter P, indicating the particular program associated with each supervisor or user program state change. The next five bits, identified by the capital letter T, are indicative of five different state changes which may occur within the host computer 10. Starting with bit 8 of register A, the five state change bits contain information relating to the following five events:

| Bit Number | State Change |
|---|---|
| Bit 8 | The occurrence of an I/O interrupt |
| Bit 9 | A start I/O command |
| Bit 10 | A supervisor or user program change |
| Bit 11 | A change in the active/wait status of the host computer |
| Bit 12 | A change in the start/stop status of the host computer |

Referring to OR gate 152, and in view of the fact that the inputs of OR gate 152 are connected with the five state change inputs 92, 94, 134, 144 and 150 of register A, a strobe signal will be supplied by lead 154 to the strobe input 156 of register A upon the occurrence of any of the above listed state changes. In addition, the timer overflow signal on line 152 from the 17th bit of timing register 298 will likewise produce a signal from the output of gate 152 to strobe the state change register A.

It is also noted that the supervisor/user program state change signal at bit 10 of register A is supplied to input 134 thereof from OR gate 130. Thus, a change of any 1 bit in the 4 bit binary word representing the program status protect key on lines 106 through 112 produces an output signal on line 132 to indicate a change in the program being handled by the computer.

When a state change is detected by register A, a strobe signal is generated, as noted above, whereupon the registered information will be collected and subsequently read out and fed through cable 160 to input port A of the priority sampler 302 (FIG. 4). At this same time, the strobe signal on line 154 will be fed via line 158 to the A input of the priority sampler 302 indicating that information is available for receipt on input port A from register A.

Since the strobe signal on line 158 is also applied to input 314 of the timing register 298, the instantaneous value of time registered therein at the occurrence of the detected state change will be strobed out and fed via cable 300 to the priority sampler input T. Since clock network 294 is constantly advancing the register contents of timing register 298, register 298 acts as a master clock for the monitor 40 according to the present invention for time stamping or time identifying the state change signals detected from the host system.

In the event of a start input-output command in the host system 10, a signal will be detected and fed via line 95 to input 94 of register A and will initiate the above-described sequence of events, namely, the strobe read-out of the contents of register A and timing register 298. In addition, the start I/O signal on line 95 will be coupled to the strobe input 218 of register B (FIG. 3). As noted above, register B contains data describing the state change transition associated with a start input-output command. This data is in the form of a 4-bit channel address and an 8-bit device address identifying the component to which the start input-output command is directed. Thus, the value of register B identifying the component involved in the start I/O state change will be fed over leads 222 to input port B of priority sampler 302 upon receipt of the strobe signal on input 218. Further, the start I/O signal on line 95 will also be sent over line 220 to input terminal B of the sampler 302 for identification purposes.

In like manner, register C contains data describing the state change transition associated with an I/O interrupt. This data is in the form of a 4-bit word representing status information indicative of the status of the component which is causing the interrupt to occur, a 4-bit word representing the channel address and an 8-bit word representing the device address of the unit initiating the I/O interrupt. The I/O interrupt signal on line 93 is applied to strobe input 288 of register C and the information contained therein fed over cable 292 to the input port C of priority sampler 302. The strobe signal on line 290 is applied to input terminal C of the sampler to notify the priority network of the identity of the incoming data from register C.

Thus, upon the occurrence of a host computer start-stop or active-wait state change, the contents of the state change register A and the timing register 298 will be fed through priority sampler 302 to the buffer 46. In the event of a host computer program change, registers A and 298 will transmit data in the same manner as described above, with the program status word protect key associated with the program change and stored in register A, bits 4 through 7, transmitted to the data buffer for subsequent analysis. Should a start I/O or I/O interrupt state change be detected, register A and either register B or register C, depending upon the particular type of state change, will be fed through the priority sampler along with the contents of timing register 298. Further, the 16-bit data word applied to buffer 46 will be identified by the 2-bit word on lines 322 and 324 which, in the present embodiment, will be "00" for register 298, "10" for register A, "01" for register B, and "11" for register C.

In this manner, each time a particular state change event is received by the monitor 40, address and identification data associated with the components either causing the state change or receiving commands as a result of the state change is collected and correlated with the instantaneous contents of timing register 298 to in effect time stamp or time identify not only the state change but the component or components involved therewith as well. Since data is collected by the monitor in accordance with the method of the present invention only during such state change intervals, and in view of the fact that the time during which the state change occurs represents only a minor fraction of total component use time, virtually every phase of computer activity may be readily monitored within economically feasible limits and with accuracy.

Thus, it can be seen that the present invention provides for the rapid and accurate collection of utilization and performance data from the host system in a manner facilitating precise analysis of computer activity. As noted above, each state change in the start-stop or active-wait status of the computer is detected, a supervisor or user program change is identified, and input-output start and interrupt events are monitored in accordance with the present invention. Further, the precise time of occurrence of such state changes is accurately registered as is the channel and device address of the particular component associated with the detected event. In addition, the identifying program status word protect key is captured upon each program state change, and the channel status word protect key and channel status bits are identified upon the occurrence of each I/O interrupt.

Since the above information is collected by time-stamping computer component activity data only at the instant of occurrence of a state change in accordance with the method of the present information, effective monitoring is capable at a fraction of the cost of prior art systems. Of equal importance is the fact that the data so collected is in a form which may be analyzed and collated by a number of different types of data processing apparatus and, in particular, by a programmable digital computer, such that the computer performance evaluation may be made almost instantaneously. For example, upon the detection of a start I/O command, data is collected from register A identifying the nature of the state change which has occurred. Data is also collected from register B identifying the channel and device address of the component receiving the start command. In addition, all of the above is time keyed by the strobe read-out of timing register 298.

The above data extraction process takes place in a very short time, freeing the apparatus to monitor additional state changes even though the particular component receiving the I/O command is still active. This, of course, is a material departure from conventional count or time mode analysis which ties up an entire monitoring network for the entire duration of activity of each individual component under study.

At a subsequent time, when the component which was previously activated has completed its operation, it will generate an I/O interrupt which is detected by register A, time identified by register 298 and located by the address and identification data in register C. Since the device associated with the I/O interrupt is accurately identified, it becomes a simple task to locate the start I/O time of that component obtained earlier by the present apparatus and stored in the memory of the data processor 52. After subtracting, the time during which the component was active and the program involved (identified by the channel status word protect key) can be tabulated with like data so that at the end of a particular computer run, an accurate picture of computer performance will be available. Of course, the above is merely illustrative of one single measurement made in accordance with the present invention, and it should be appreciated that numerous data analyses may be likewise effectuated in providing a complete computer utilization profile.

It is noted that the present invention functions separately from the host system and, aside from the probe connections, requires no disruption or modification thereof. The present monitoring system also does not interfere with or in any way affect the operation of the host computer since data collected from the computer is rapidly processed through high speed buffer 46 without necessitating periodic interruption of programs being run on the host system. In other words, the present invention enables the effective and accurate monitoring of the host system without encumbering the same with complex hardware or software systems and at absolutely no cost in computer time.

Figure 6:
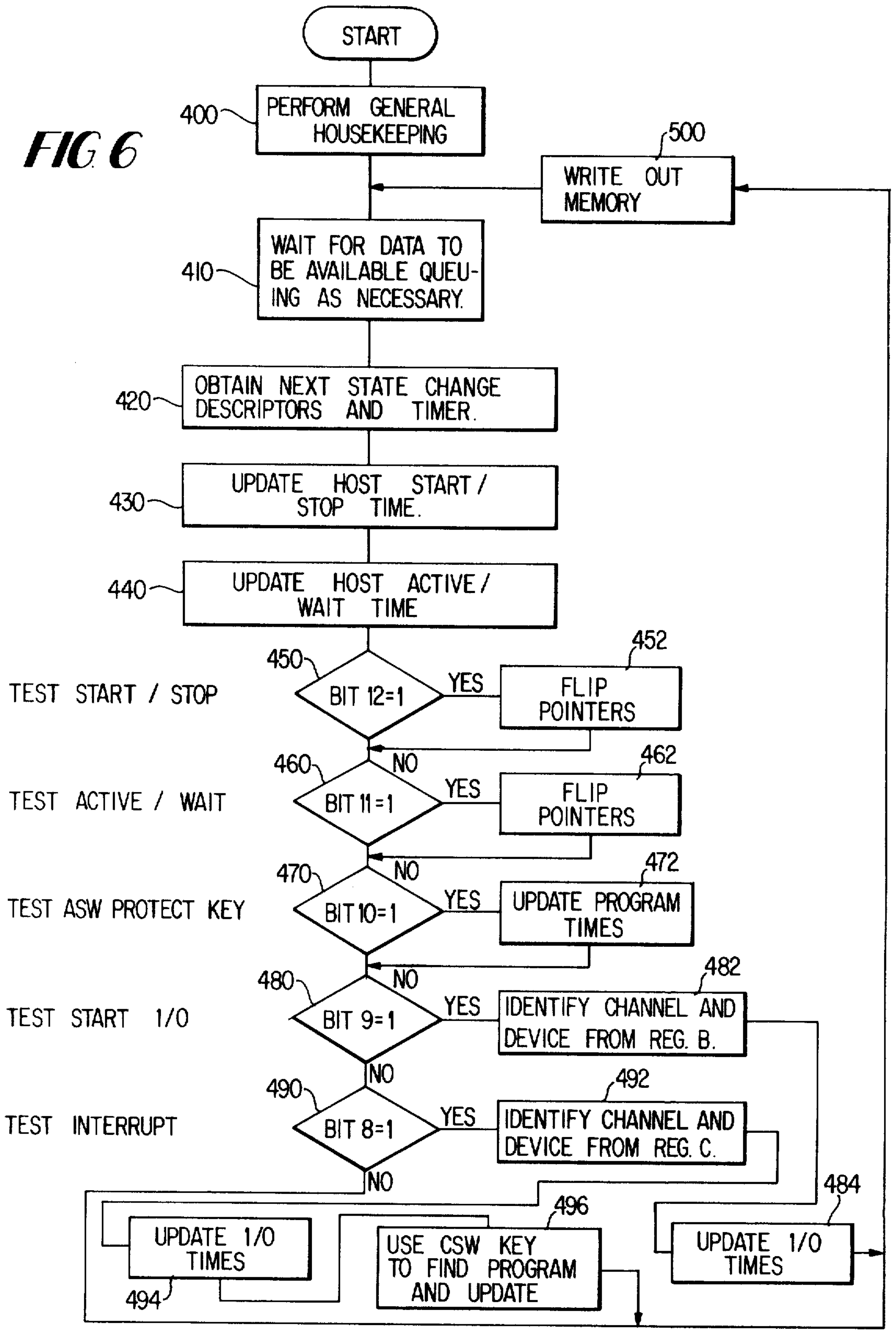
FIG. 6 is a flow chart of an exemplary program performed by the data processor of FIG. 4 in accordance with the present invention.

To further carry out the teachings reflected by the present invention, it is appropriate to discuss one preferred method by which the software in the data processor 52 may process the state change information transmitted to it from the data buffer 46. Referring to FIG. 6, at the start of the program the data processor performs general housekeeping at step 400 which involves the initialization or resetting of the various control parameters to accept the new incoming data. At step 410, data is read from the collection registers and the timing register through the high speed buffer 42 and placed into a circular queue. Data will continually be read and placed in the queue until there is no more data available whereupon control will be transferred to step 420. While the circular queueing technique is not necessarily required, it functions as a second level buffer, supporting the high speed buffer 46 to handle high bursts of state changes in the monitored computer system. Step 410 will be entered by causing a data processor interrupt in processing system 52 whenever a state change which has occurred in the host system causes the collection and transmission of data from the registers A, B and C.

At step 420, a set of data consisting of the timing register, the state change register and registers B or C, depending upon the nature of the state change which has occurred, is obtained from the circular queue and the incremental value of the timing register since the last transmission is added to a master timer memory. At step 430, the incremental timing register value since the last transmission is added to a variable which represents the current start-stop state of the monitored computer. In other words, upon each change of host computer state from a stop to a start condition, the time of such transition is noted and stored cumulatively by step 430. Likewise, step 430 adds the incremental timer value since the last transmission to a variable which represents the current or cumulative active-wait state of the host system. At step 450, the state change register, and specifically bit 12 thereof, is tested to determine if the host computer has entered a start or stop state. If the computer has entered a start condition, the start-stop variable pointer is altered at step 452 to allow step 430 to accumulate host computer start time. Step 430 will continue to accumulate time until a subsequent state change signal is received indicating that the computer has changed to its stop state.

In a similar manner, step 460 tests the state change register A to determine if the host computer has entered an active or wait state. Such information is available by examination of bit 11 of register A which, if it indicates that the computer is now active, causes step 462 to alter the active-wait variable pointer to allow step 440 to accumulate active computer time into the new state.

The state change register A is tested at step 470 to determine if program control has been altered; if so, at step 472 the old program protect key is used to find the related program and the active time when the program gained control is subtracted from the current computer active time variable created in step 440. The result is tabulated and added to the host computer active time in connection with that particular program as identified by the program status word protect key. Thereafter, the new program protect key contained in the state change register is used to find data associated with such program and the current computer active time variable created in step 440 is placed into storage as the active time when program gained control. Then, the new program protect key is transferred to the old program protect key variable.

Step 480 tests the state change register to determine if a start I/O state change has occurred. If so, step 482 uses register B to find the related channel or control unit and device address. At step 484, the master timer created in step 420 is used to register the time when the I/O started and the host computer wait variable created in step 440 is used to register the wait value when the I/O started.

At step 490, the state change register is tested to determine if an I/O interrupt state change has occurred. If so, step 492 uses register C to find the related channel or control unit and device address and the channel status bits in register C are interrogated to determine which component caused the interrupt. The time the I/O started, from step 484, is subtracted from the master timer created in step 420 to yield the I/O time and the result is added to derive a cumulative I/O figure. The wait value when the I/O started, from step 484, is subtracted from the computer wait variable created in step 440 to yield the I/O wait value and the results added to derive a cumulative time figure. The channel status word protect key contained in the state change register A is used to find the appropriate program and the previously computed I/O time and wait on I/O are added to the program I/O and program wait on I/O.

At appropriate user selected intervals of time, step 500 writes out all measured values to an attached output device (not shown) which, for example, may be a magnetic tape drive, a CRT video display, communication channels to the host or other computers, and the like, and clears all appropriate variables. If an actual print out from the data processor 52 is desired, any number of customer selected formats may be provided. The print out, for example, may provide a tubular list having a first column listing the various user program identification keys, a second column indicating the active time when the various programs gained control, and a third column indicating the cumulative host computer active time spent in performing the instructions of each listed program. In addition, the processor print out may provide additional information listing the channel and device address, the time an I/O command was initiated, the elapsed time during the I/O sequence or the wait value, and the cumulative elapsed time spent on I/O by each of the various components and programs being operated upon by the host system.

Thus, the present invention provides a simple, accurate and extremely flexible method for extracting computer utilization data without affecting or otherwise interrupting the operation of the host system. While any number of other measurements can be made in addition to those illustrated herein, such as the overlap time of channels and/or devices during computer operation, interrupt service time associated with the various channels and/or devices and programs requesting input-output operation, supervisor time associated with a program requesting supervisor service, and the like, the above analysis has been specifically selected for purposes of simplicity and clarity only. Thus, great flexibility in monitoring general purpose digital computers is provided by the present invention in accordance with the present monitoring method which includes identifying the nature of a state change within the host system, registering channel device and program information associated with the detected state change, and correlating the same with the precise time of occurrence of the state change.

Inasmuch as the present invention is subject to many variations, modifications, and changes in detail, it is intended that all matter contained in the foregoing description or shown in the accompanying drawings shall be interpreted as illustrative and not in a limiting sense.

What is claimed is:

1. Apparatus for extracting performance data from a general purpose digital computer having a processing unit, a main storage bank for storing programs and data, an input-output network connecting the computer with a plurality of external devices via selected communications channels, and a control unit capable of interrupting the processing unit, the computer having a plurality of distinct operative states, wherein the apparatus comprises:

first data collection means connected with the computer to register the occurrence of a state change exhibited thereby, second data collection means connected with the computer to register the address of a computer component associated with said state change, time stamping means connected with said first data collection means and responsive to the occurrence of said state change for registering the real time of occurrence thereof, and means connected with said first and second data collection means and said time stamping means for extracting registered data therefrom pertaining to state changes experienced by a particular computer component for enabling evaluation of computer performance.

2. The invention as recited in claim 1 wherein said first and second data collection means comprise first and second collection registers.

3. The invention as recited in claim 2 wherein said first collection register has a set of input terminals connected with the computer to register changes in the operative state thereof and has a strobe input connected with said set of inputs whereby the contents of said first register may be read-out upon the occurrence of any one of said state changes.

4. The invention as recited in claim 1 wherein said second data collection means comprises a pair of collection registers connected to the computer to register the address of a component associated with the start of an input-output sequence and an input-output interrupt, respectively.

5. The invention as recited in claim 1 further including buffer means connected to receive output signals from said first and second data collection means and said clock means for collecting the same in a predetermined sequence.

6. A method of extracting data for monitoring the performance of a general purpose digital computer comprising the steps of:

connecting a plurality of data collection registers to the computer to register signals representative of the operative state thereof and the address of computer components associated therewith, detecting the occurrence of a change in the operative state of the computer, recording the time of occurrence of said detected state changes, and recording the address of computer components associated with each of said detected state changes, identifying a particular computer program associated with each of said detected state changes and recording such identification in a collection register.

* * * * *